June 3, 1930.  A. D. FISHER  1,760,900
MANUFACTURE OF CHOCOLATE CONFECTIONERY
Filed June 26, 1926
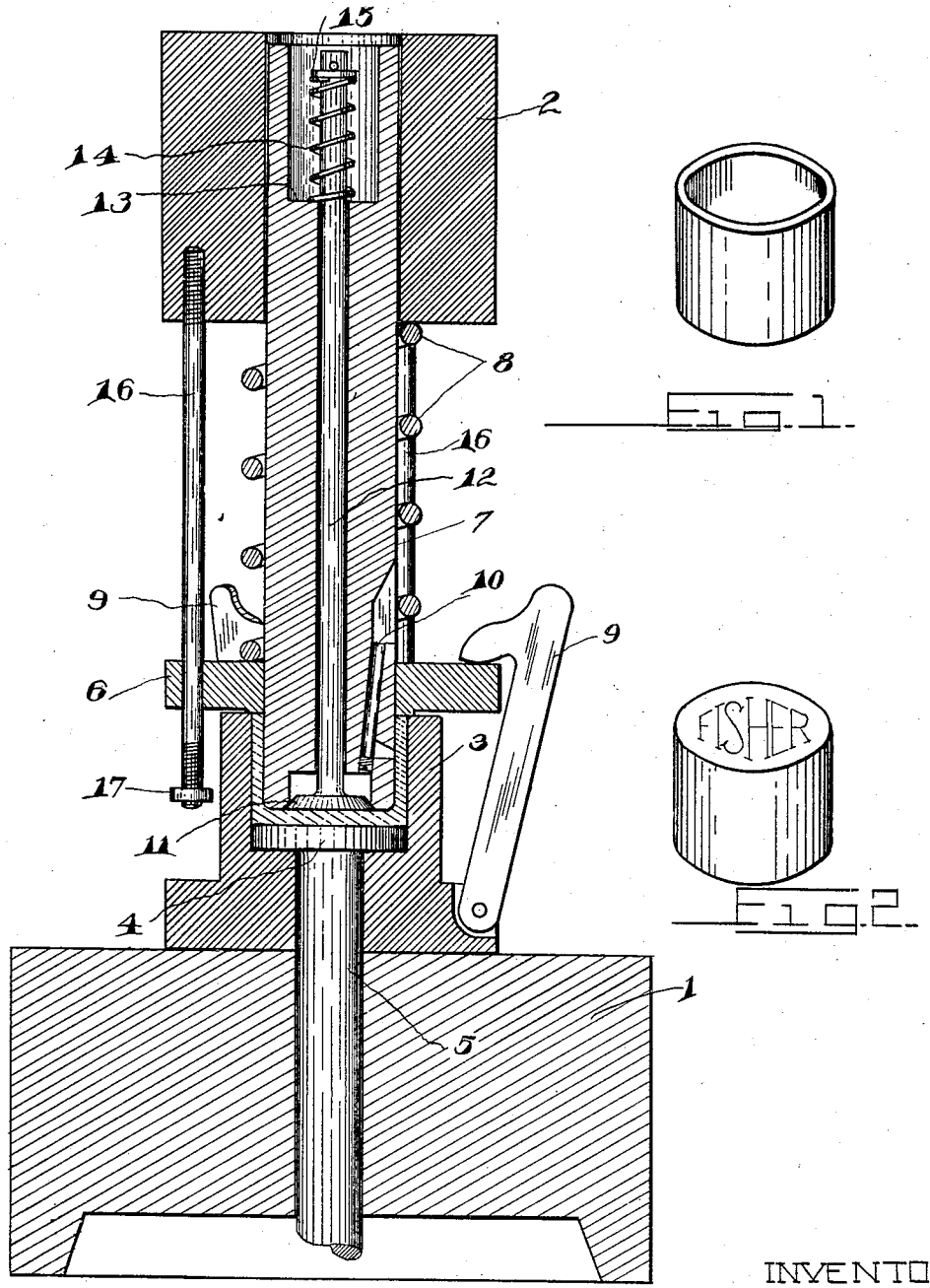
INVENTOR
A. D. Fisher
BY J. Edward Maybee
ATTY Patented June 3, 1930

1,760,900

UNITED STATES PATENT OFFICE

ALEXANDER D. FISHER, OF TORONTO, ONTARIO, CANADA

MANUFACTURE OF CHOCOLATE CONFECTIONERY

Application filed June 26, 1926. Serial No. 118,741.

This invention relates to the manufacture of cup-like containers or shells of chocolate which are subsequently filled with a plastic or liquid filling and thereafter sealed.

It has been proposed to form such cup-like shells by molding melted or plastic chocolate by means of dies or in centrifugal molds but such processes have not come into commercial use owing to difficulties in handling the plastic material and in obtaining satisfactory output owing to the time required to cool the plastic chocolate before the cups could be removed from the molds.

My object therefore is to devise a process of and means for producing cup-like shells of uniform character and high quality at a high rate of speed so that filled chocolate confections may be produced at a lower cost than is now possible either by the processes hereinbefore referred to or by the ordinary process of molding the filling in starch and afterwards coating them with chocolate.

I attain my object by molding cups from solid or bulk chocolate, that is, chocolate such as used in ordinary chocolate creams at such a temperature that it is non-plastic under low pressures. Such chocolate cups I have found can be molded under very high pressure in closed molds provided with means for permitting the escape of surplus chocolate at the high pressures employed. Under the pressures I employ, the chocolate will flow to all parts of the mold. The molded product may be released from mold and when released is hard, tough, and close grained and ready for immediate handling and filling.

For producing the chocolate cups I employ a mold, a mold cover and plunger operating through the cover, and a stripper operating through the bottom of the mold. Means are provided to allow the escape of surplus chocolate under high pressure and means to admit air between the plunger and the bottom of the cup, when the plunger is lifted out of the cup, to prevent breakage of the bottom due to suction.

The invention is hereinafter more specifically described and the apparatus illustrated in the accompanying drawings in which Fig. 1 is a perspective view of a chocolate cup manufactured by my new process;

Fig. 2 a similar view showing the cup reversed; and

Fig. 3 a vertical section of apparatus suitable for the carrying out of my process.

In the drawings like numerals of reference indicate corresponding parts in the different figures.

1 is a press bed and 2 the punch holder. The punch holder will be mounted and operated as in any ordinary press. The press bed carries the mold 3, in the bottom of which is located the stripper 4 connected to the stripper plunger 5. The mold is provided with the cover 6 through which the plunger 7 operates. The mold may be of any desired form provided the moulded product is capable of being withdrawn through the open upper end thereof. I show the mould as being cylindrical in form with a flat bottom. The mold cover may be held in position to close the mould either fixedly or resiliently. If surplus chocolate is to be allowed to escape between the mould cover and the rim of the mould, a heavy coil spring 8 located between the cover and the punch holder may be employed. If an exactly measured quantity of chocolate is inserted in the mould, the mould may be fixedly held in position by means of latches such as 9. If a surplus of chocolate is introduced into the mould, as will usually be the case, it is necessary to provide for the escape of surplus chocolate when the high pressure under which the chocolate is moulded is developed. As stated, surplus chocolate may be allowed to escape between the rim of the mould and the cover, but I prefer to form through the plunger a passage 10 of limited cross sectional area, at least where it communicates with the interior of the mould, so that chocolate may only pass therethrough under very high pressure. For convenience means might be provided for adjusting the cross sectional area of the relief passage.

As the plunger necessarily has a very close fit in the interior of the moulded chocolate cup, there is danger of the bottom of the chocolate cup rupturing when the plunger is withdrawn. I therefore provide means for admitting air between the end of the plunger and the bottom of the cup. For this purpose I provide the valve 11 of frusto-conical form, so as to provide for rapid opening, which valve is secured to the stem 12 guided in the interior of the plunger. The latter is counterbored to form a shoulder 13 and the coil spring 14 is provided bearing against this shoulder and a collar 15 secured to the upper end of the valve stem. When the plunger lifts, the valve will open due to the suction produced, and after the plunger has been withdrawn from the cup, the spring 14 will return the valve to its normal position ready for the moulding of a fresh cup.

The upper surface of the stripper 4, which forms the bottom of the mold, may have any suitable design formed thereon, which it is desired to impress on the bottom of the cup or cups.

For convenience in raising the mould cover 6, I provide the lifter rods 16 secured to the punch holder, which lifter rods pass through the cover and have nuts 17 screwed on their lower ends.

In carrying out my process I employ hard or bulk chocolate. This may be any compacted chocolate suitable for the production of chocolate confectionery and which is solid below a temperature of 90 degrees Fahr. Such chocolate usually becomes plastic when heated above the temperature of 90 degrees F. I find, however, that to mould solid or bulk chocolate by pressure that it is necessary to operate at temperatures considerably below 90° F. I also find it necessary to operate above a certain minimum temperature. For example, if the temperature is below 50 degrees F., it is impossible to produce a cup which is homogeneous, coherent and free from cracks. I find that best results are obtained by operating at a temperature of about 67 degrees F., and if necessary the mould should be cooled to permit it to operate at this temperature whenever the atmospheric temperature is materially above 67 degrees F.

In carrying out my process I introduce a suitable quantity of solid chocolate into the open mould. This may be in broken form or in the form of a cake or piece of suitable dimensions to readily fit within the mould. The punch holder is then brought down to cause the cover to engage and close the open upper end of the mould. The plunger is then forced down within the mould until the chocolate has been displaced upwardly between the wall of the mould and the plunger to completely fill this annular space. I find that a pressure of 300 pounds per square inch or more is usually necessary for this purpose. Under the high pressure developed, surplus chocolate escapes in the manner hereinbefore described. The plunger is then retracted, the valve 11 opening as hereinbefore described to break the suction within the cup. The cover is next lifted by the lifter rods 16 and thereafter the finished cup is lifted from the mould by means of the stripper 4.

What I claim is:

1. A process of producing chocolate, from non-plastic bulk chocolate, in hollow form which consists in confining the chocolate in a closed mold and projecting into the mould a plunger of less diameter than the mold to subject the chocolate to a high pressure and to displace it in the mold about the plunger in a direction contra to that of the molding movement of the plunger, the temperature being maintained below the point at which the chocolate becomes plastic.

2. A process according to claim 1 in which to avoid any trouble due to any differences in the bulk of different charges of chocolate, surplus chocolate is allowed to escape under the high pressure generated in the mold.

3. A process of producing hollow molded chocolate from non-plastic bulk chocolate maintained at a temperature below that at which it becomes plastic which consists in placing in the bottom of a mold a quantity of the non-plastic chocolate materially less in volume than the interior of the mold, projecting into the mold a plunger of less diameter than the mold to subject the chocolate to a pressure sufficiently great to cause it to flow up between the mold and plunger in a direction contra to that of the molding movement of the plunger, and continuing the pressure movement till the mold about the plunger is substantially filled.

4. A process of producing hollow molded chocolate from non-plastic bulk chocolate maintained at a temperature below that at which it becomes plastic which consists in confining in the bottom of a mold a quantity of the non-plastic chocolate materially less in volume than the interior of the mold, projecting into the mold a plunger of less diameter than the mold to subject the chocolate to a pressure sufficiently great to cause it to flow up between the mold and plunger in a direction contra to that of the molding movement of the plunger, and continuing the pressure movement till the mold about the plunger is substantially filled, surplus chocolate being allowed to escape under the high pressure generated in the mold.

Signed at Toronto, Canada, this 19th day of June, 1926.

ALEXANDER D. FISHER.